United States Patent [19]
Hilliard

[11] Patent Number: 5,316,818
[45] Date of Patent: May 31, 1994

[54] STEERING LINKAGE REPAIR KIT

[76] Inventor: Franklin R. Hilliard, 511 E. Santa Fe Ave., Grants, N. Mex. 87020

[21] Appl. No.: 69,759
[22] Filed: Jun. 1, 1993
[51] Int. Cl.⁵ .................................................. B32B 3/06
[52] U.S. Cl. ...................... 428/99; 403/256; 403/398
[58] Field of Search .................. 403/256, 398; 428/99

[56]  References Cited
U.S. PATENT DOCUMENTS 1,757,413  5/1930  Collins ................................. 403/256
4,046,480  9/1977  Leensvaart ........................... 403/398
5,199,323  4/1993  Kaufman .............................. 403/256

Primary Examiner—Alexander S. Thomas
Attorney, Agent, or Firm—Leon Gilden

[57]  ABSTRACT

A support plate having an arm rod receiving bore is arranged to receive an arm rod of a second linkage arm for securement to a first linkage arm, with the support plate including a clamp plate having an arcuate concave recess arranged to accommodate the second linkage arm between the clamp plate and the support plate.

3 Claims, 4 Drawing Sheets

STEERING LINKAGE REPAIR KIT

BACKGROUND OF THE INVENTION

1. Field of the Invention

The field of invention relates to steering linkage apparatus, and more particularly pertains to a new and improved steering linkage repair kit wherein the same is arrange to accommodate a worn linkage arm.

2. Description of the Prior Art

Steering linkage is subject to wear and to this end, a coupling between first and second linkage arms is typically arranged with a support rod received through a bore of a head portion of an associated linkage arm, wherein the arm rod relative to the arm rod support head is subject to wear, wherein to accommodate such wear, the instant invention is arranged to secure the linkage arm relative to the arm rod in a fixed relationship preventing undesired continued movement of the arm rod relative to the associated support arm and in this respect, the present invention substantially fulfills this need.

SUMMARY OF THE INVENTION

In view of the foregoing disadvantages inherent in the known types of steering linkage now present in the prior art, the present invention provides a steering linkage repair kit wherein the same is arranged to fixedly secure a second linkage arm relative to a second linkage arm rod member to provide for fixed association therebetween. As such, the general purpose of the present invention, which will be described subsequently in greater detail, is to provide a new and improved steering linkage repair kit which has all the advantages of the prior art steering linkage apparatus and none of the disadvantages.

To attain this, the present invention provides a support plate having an arm rod receiving bore arranged to receive an arm rod of a second linkage arm for securement to a first linkage arm, with the support plate including a clamp plate having an arcuate concave recess arranged to accommodate the second linkage arm between the clamp plate and the support plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved steering linkage repair kit which has all the advantages of the prior art steering linkage apparatus and none of the disadvantages.

It is another object of the present invention to provide a new and improved steering linkage repair kit which may be easily and efficiently manufactured are marketed.

It is a further object of the present invention to provide a new and improved steering linkage repair kit which is of a durable and reliable construction.

An even further object of the present invention is to provide a new and improved steering linkage repair kit which is susceptible of a low cost of manufacture with regard to both materials and labor, and which accordingly is then susceptible of low prices of sale to the consuming public, thereby making such steering linkage repair kits economically available to the buying public.

Still yet another object of the present invention is to provide a new and improved steering linkage repair kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
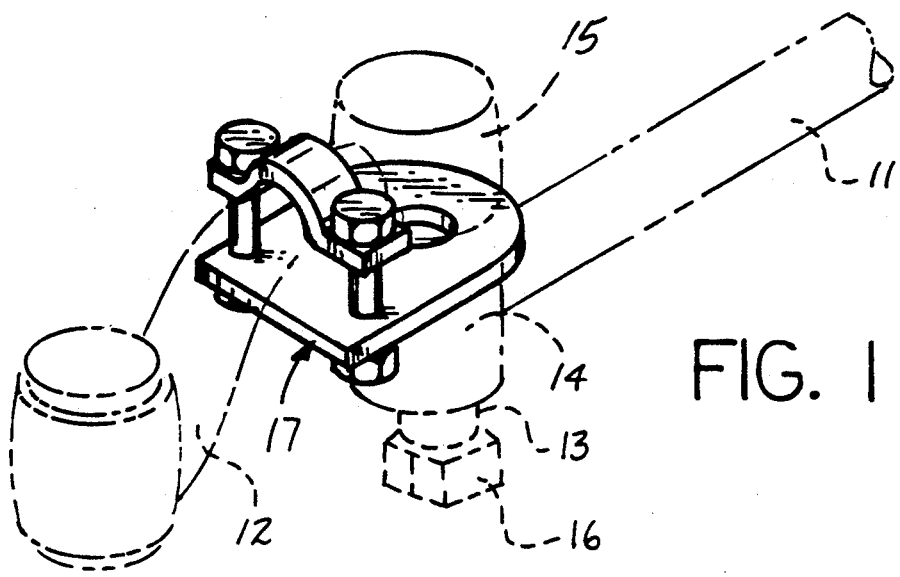
FIG. 1 is an isometric illustration of the invention in use.
Figure 2:
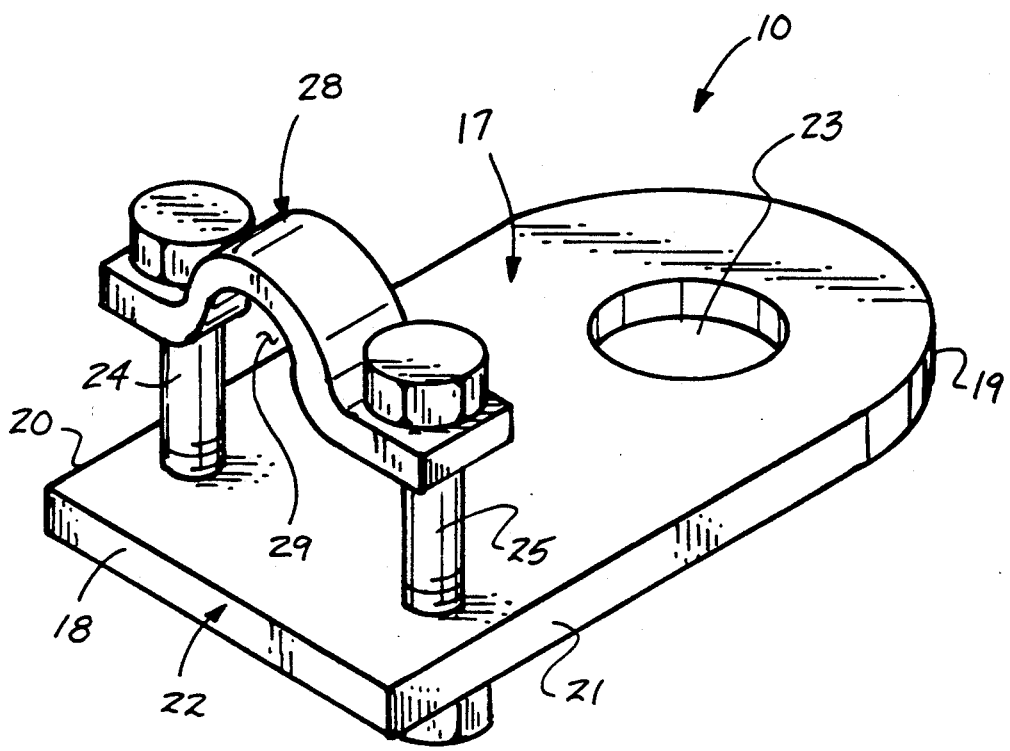
FIG. 2 is an enlarged isometric illustration of the invention.
Figure 3:
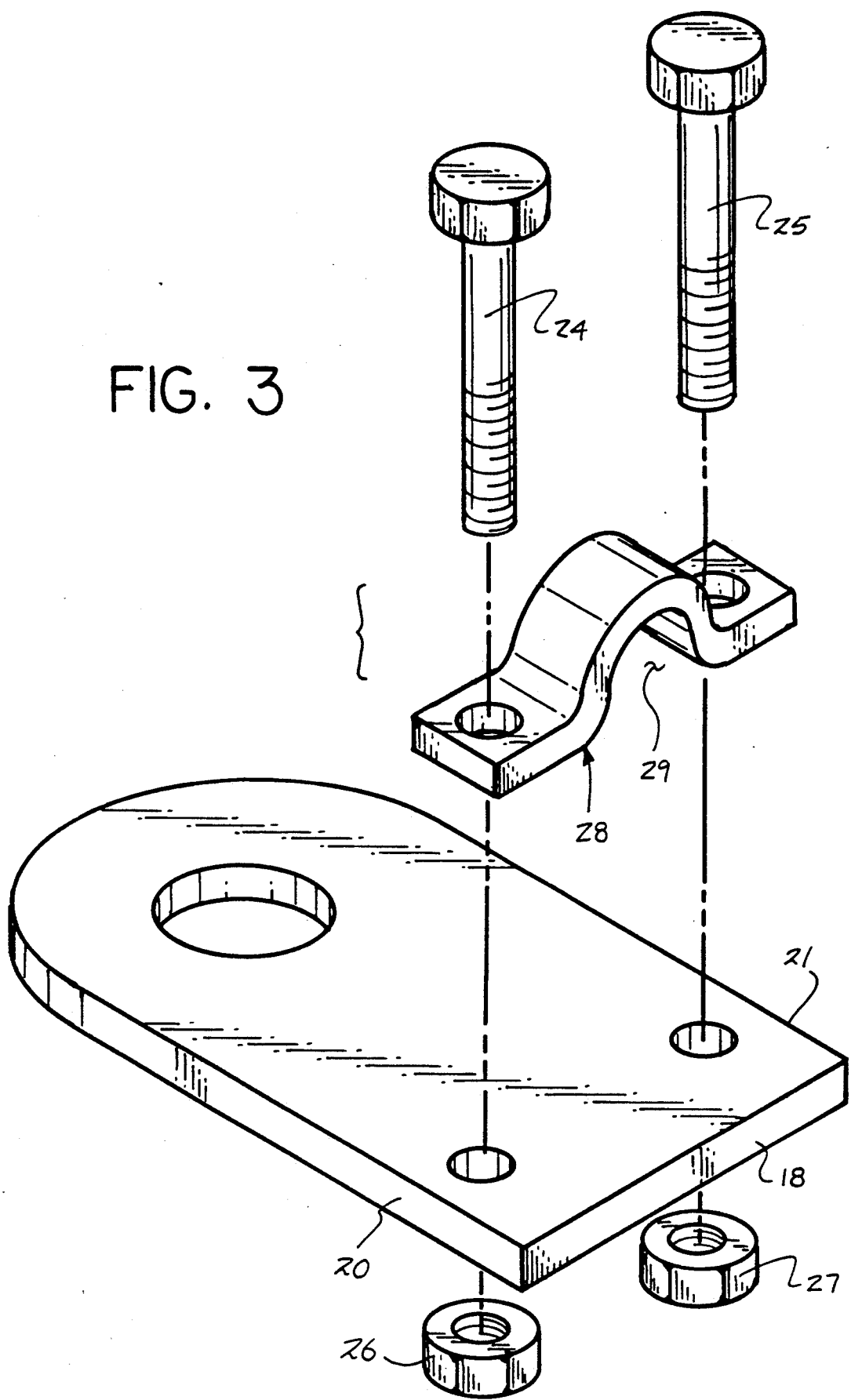
FIG. 3 is an enlarged isometric exploded view of the invention indicating the various components thereof.

With reference now to the drawings, and in particular to FIGS. 1 to 7 thereof, a new and improved steering linkage repair kit embodying the principles and concepts of the present invention and generally designated by the reference numeral 10 will be described.

Figure 4:
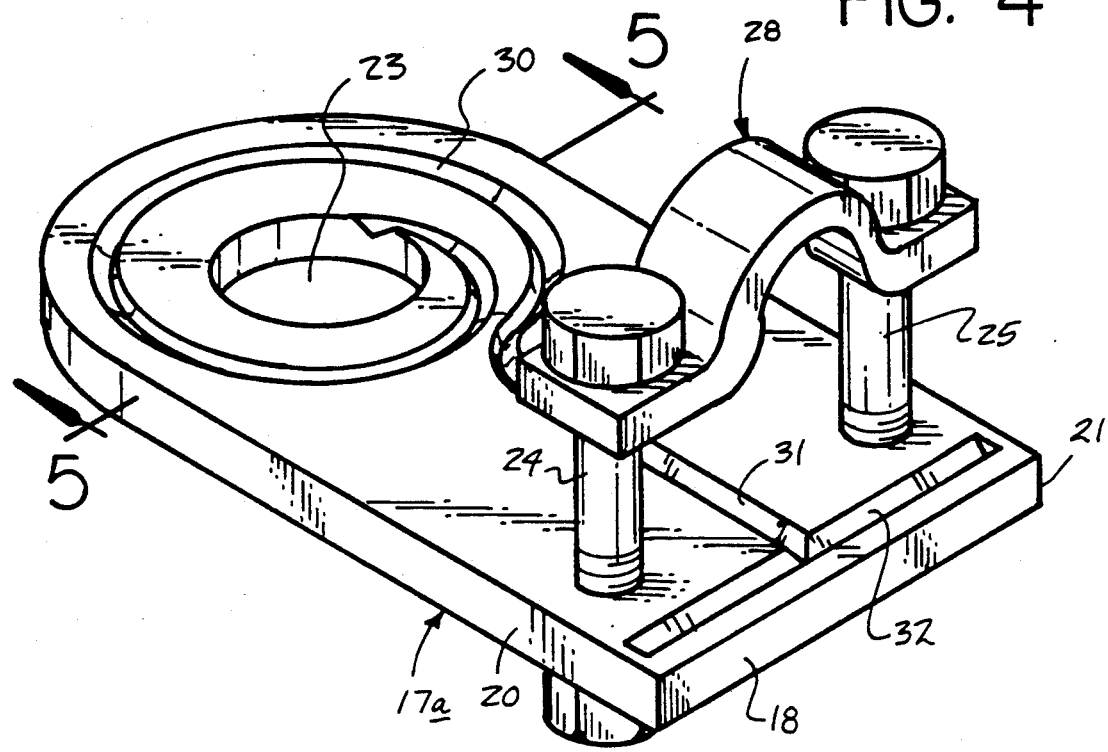
FIG. 4 is an isometric illustration of a modified aspect of the invention.
Figure 5:
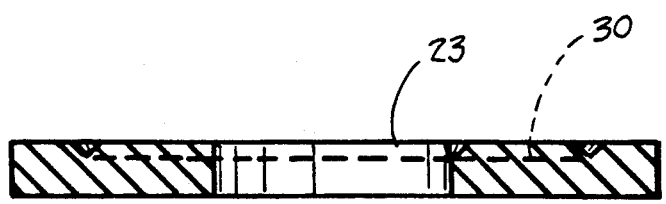
FIG. 5 is an orthographic view, taken along the lines 5—5 of FIG. 4 in the direction indicated by the arrows.
Figure 6:
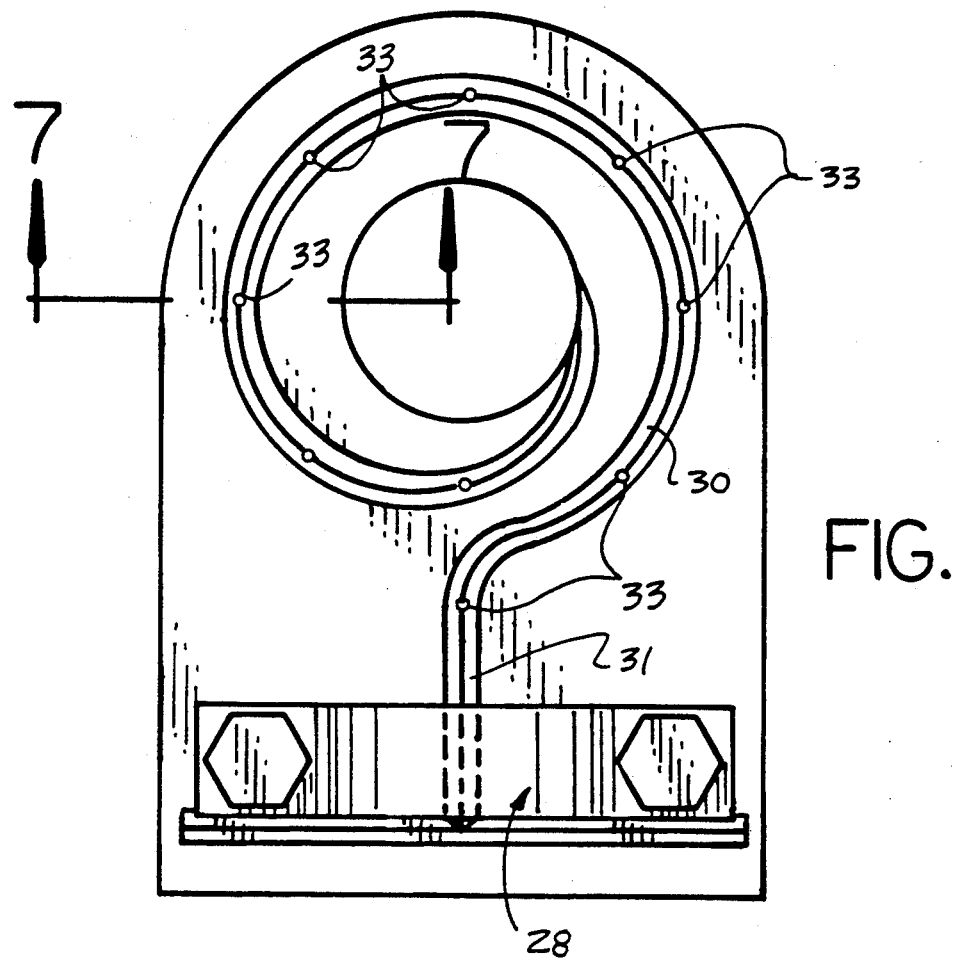
FIG. 6 is an orthographic top view indicating a lubricant groove having weep holes to direct excessive lubricant therefrom.
Figure 7:
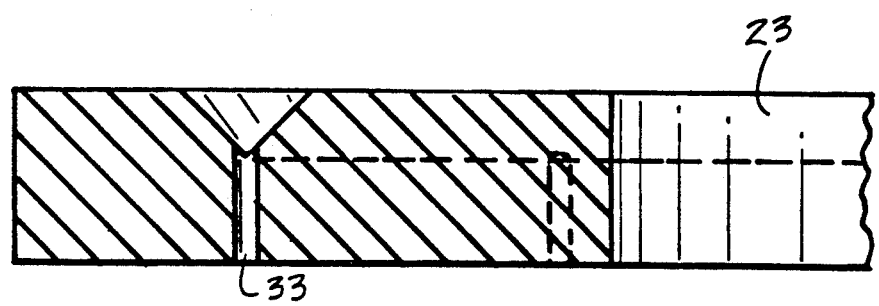
FIG. 7 is an orthographic view, taken along the lines 7—7 of FIG. 6 in the direction indicated by the arrows.

More specifically, the steering linkage repair kit 10 of the instant invention essentially comprises a first linkage arm 11 arranged for mounting to a second linkage arm 12, with the first linkage arm 11 having a first linkage arm head 14 having a bore directed therethrough for receiving a second linkage arm rod 13 mounted to the associated second linkage arm head 15. A fastener 16 is arranged for securement to typically the threaded second linkage arm rod 13. The invention 10 is arranged to effect stability and integral association of the second linkage arm rod 13 to the second linkage arm 12. To this end, a support plate 17 is provided of a generally planar rigid construction, having a top wall spaced from a bottom wall, with the support plate having a continuous peripheral side wall 22 including a first end 18, a second end 19 of a generally arcuate configuration, with respective spaced first and second sides 20 and 21. An arm rod receiving bore 23 concentric relative to the arcuate second end 19 is provided to provide for requisite clearance upon rotation of the first linkage arm 11 to the second linkage arm 12 preventing engagement of the support plate 17, and more specifically the continuous peripheral side wall 22. First and second clamp rods 24 and 25 are orthogonally directed through the support plate 17, having respective first and second fasteners 26 and 27 arranged to engage the bottom wall of the support plate 17, with a clamp plate 28 positioned over the top wall, with the first and second clamp rods 24 and 25 directed therethrough. Medially of the first and second clamp rods 24 and 25 is an arcuate recess 29 whose concave surface is arranged in facing relationship relative to the support plate top wall. In this manner, clamping of the clamp plate 28 secures the second linkage arm 12 between the clamp plate 28 and the support plate 17. A modified support plate 17a is indicated in FIG. 4 for example, having a helical groove 30 oriented about the receiving bore 23 in communication therewith, with the helical groove 30 extending to a first feed groove 31 that in turn intersects a second feed groove 32 that extends orthogonally between the first and second sides 20 and 21. To this end, lubricant fluid may be directed into the second feed groove 32 to feed the first feed groove 31 that in turn directs such lubricant fluid to the helical groove 30 to insure lubrication directed to the exterior surface of the second linkage arm rod 13 when directed through the bore 23. To eliminate excess fluid within the grooves 30–32, the FIGS. 6 and 7 indicates a plurality of weep holes 33 directed from the feed grooves 31 and 32 through the support plate bottom wall to thereby drain excess fluid from the groove while preventing flow of ample fluid to the receiving bore 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A steering linkage repair kit arranged for cooperation with a linkage arm, having a linkage arm head and a linkage arm rod directed from the linkage arm head, wherein the repair kit comprises, a support plate, the support plate including a continuous peripheral side wall, the side wall having a first end, a second end, a first side, and a second side, with an arm rod receiving bore directed orthogonally through the support plate in adjacency to the second end, and clamp means mounted in adjacency to the first end for securing the linkage arm between the clamp means and the support plate, and the support plate includes a top wall spaced from a bottom wall, with the clamp means including a first clamp rod and a second clamp rod orthogonally directed through the top wall and the bottom wall, with the first clamp rod having a first fastener arranged for engaging the bottom wall, and the second clamp rod having a second clamp rod fastener arranged for engaging the bottom wall, wherein the first fastener and the second fastener are arranged for respective securement to the first clamp rod and the second clamp rod respectively, and the clamp means further includes a clamp plate, the clamp plate receiving the first clamp rod and the second clamp rod slidably therethrough, wherein the clamp plate has an arcuate recess between the first clamp rod and the second clamp rod in the clamp plate, with the arcuate recess having a concave surface in a facing relationship relative to the top wall.

2. A repair kit as set forth in claim 1 including a helical groove directed into the top wall in communication with the arm rod receiving bore, the helical groove extending to a first feed groove, with the first feed groove oriented between the first clamp rod and the second clamp rod, and a second feed groove intersecting the first feed groove, the second feed groove extending in adjacency to the first end between the first end and the first clamp rod and the second clamp rod.

3. A repair kit as set forth in claim 2 wherein the helical groove includes a plurality of weep holes in fluid communication with the helical groove extending through the bottom wall of the support plate to remove excess fluid directed into the helical groove from the first feed groove to the second feed groove.

* * * * *